(12) United States Patent
Kuroishi et al.

(10) Patent No.: US 10,320,165 B2
(45) Date of Patent: Jun. 11, 2019

(54) SHIELDED CONDUCTION PATH

(71) Applicant: Sumitomo Wiring Systems, Ltd., Yokkaichi, Mie (JP)

(72) Inventors: Ryo Kuroishi, Mie (JP); Hirokazu Nakai, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 45 days.

(21) Appl. No.: 15/879,046

(22) Filed: Jan. 24, 2018

(65) Prior Publication Data

US 2018/0191144 A1 Jul. 5, 2018

Related U.S. Application Data

(63) Continuation of application No. 15/385,185, filed on Dec. 20, 2016, now Pat. No. 9,912,132.

(30) Foreign Application Priority Data

Dec. 22, 2015 (JP) .................................. 2015-249380

(51) Int. Cl.
*H02G 3/04* (2006.01)
*H01B 7/00* (2006.01)
*B60R 16/02* (2006.01)

(52) U.S. Cl.
CPC ........... *H02G 3/0468* (2013.01); *B60R 16/02* (2013.01); *B60R 16/0215* (2013.01); *H01B 7/0045* (2013.01)

(58) Field of Classification Search
CPC ............... H01B 13/26; H01B 13/2606; H01B 13/2613; H01B 7/228; H01B 7/1865; H01B 7/20; H01B 9/024; H01B 7/0045; H01R 4/20; H02G 3/0481; H02G 3/0487; H02G 3/0468; B60R 16/02; B60R 16/0215

USPC ........ 174/74 R, 78, 84 C, 102 R, 106 D, 359
See application file for complete search history.

(56) References Cited

U.S. PATENT DOCUMENTS

| | | | |
|---|---|---|---|
| 6,220,605 B1 | 4/2001 | Becker, Jr. | |
| 6,864,426 B2 | 3/2005 | Miyazaki | |
| 9,490,051 B2 | 11/2016 | Ina | |
| 2004/0099427 A1 | 5/2004 | Kihira | |
| 2009/0107694 A1* | 4/2009 | Watanabe | H01B 7/16 174/102 R |
| 2011/0127084 A1 | 6/2011 | Ichikawa | |

(Continued)

FOREIGN PATENT DOCUMENTS

| JP | 2007081158 A | 3/2007 |
|---|---|---|
| JP | 2012084275 A * | 4/2012 |

*Primary Examiner* — Roshn K Varghese
(74) *Attorney, Agent, or Firm* — Reising Ethington, P.C.

(57) ABSTRACT

A shielded conduction path that makes it possible to reduce the diameter of a portion where a braided wire is fixed to a pipe. The shielded conduction path includes a pipe that has a shielding function, reduced diameter portions that are formed in the outer circumference of the pipe, braided wires that have a shielding function and are arranged such that the base end portions thereof envelop the outer circumference of the reduced diameter portions, crimp rings that are arranged so as to envelop the outer circumference of the base end portions of the braided wires and fix the braided wires to the reduced diameter portions, and a conduction path main body that is inserted into the pipe and into the braided wires.

3 Claims, 8 Drawing Sheets

(56) References Cited

U.S. PATENT DOCUMENTS

| | | |
|---|---|---|
| 2013/0140054 A1 | 6/2013 | Kato |
| 2014/0126173 A1 | 5/2014 | Hutchinson |
| 2014/0262495 A1* | 9/2014 | Oga .................... H02G 3/0481 |
| | | 174/72 A |
| 2015/0237770 A1* | 8/2015 | Yamasaki ............ H05K 9/0084 |
| | | 174/68.3 |
| 2015/0366106 A1* | 12/2015 | Yanagihara .......... H02G 3/0487 |
| | | 174/72 A |

* cited by examiner

SHIELDED CONDUCTION PATH

This application is a continuation of U.S. application Ser. No. 15/385,185, filed Dec. 20, 2016, and claims the benefit of Japanese Application No. JP2015-249380, filed on Dec. 22, 2015, the contents of both of which are hereby incorporated by reference in their entirety.

FIELD

The present invention relates to a shielded conduction path.

BACKGROUND

JP 2007-081158A discloses a shielded conduction path that includes a pipe made of a metal and an electrical line that is inserted into the pipe. In this type of shielded conduction path, flexible tubular braided wires are fixed to the two end portions of the pipe. Portions of the electrical line that extend from the two ends of the pipe are inserted into the braided wires, thus making it possible to route the two end portions of the electrical line along a curved path. Also, in the case where the shielded conduction path is used in a high-voltage application in a hybrid automobile or the like, the pipe is painted orange.

The portions where the braided wires are fixed to the pipe have a structure in which the braided wire is placed around the pipe and then a crimp ring is placed around the braided wire. The external diameter therefore increases, and the external diameter of the exterior body also increases by the same amount.

The present design was achieved in light of the above-described circumstances, and an object thereof is to reduce the diameter of the portion where the braided wire is fixed to the pipe.

SUMMARY

A shielded conduction path according to one aspect of the present design includes:

a pipe that has a shielding function, a pipe main body that is not metallic, a shielding layer that is electrically conductive, a non-reduced diameter portion, a reduced diameter portion, and an end portion that is unfolded, the electrically conductive shielding layer is laminated on the non-metallic pipe main body, and the reduced diameter portion is formed in an outer circumference of the pipe near the end portion;

a braided wire that has a shielding function and a base end portion, the braided wire is arranged such that the base end portion of the braided wire envelops an outer circumference of the reduced diameter portion of the pipe;

a crimp ring that is arranged so as to envelop an outer circumference of the base end portion of the braided wire and is located entirely within the reduced diameter portion of the pipe, the crimp ring securely fixes the base end portion of the braided wire to the reduced diameter portion of the pipe; and a conduction path main body that is inserted into the pipe and into the braided wire.

DESCRIPTION

According to an aspect (a) of the shielded conduction path according to the present design, a formation region of the reduced diameter portion in an axial direction may be a range that extends to an end surface of the pipe. According to this configuration, the outer diameter of the region of the braided wire that envelops the pipe is necessarily smaller than the outer diameter of the region of the pipe that excludes the reduced diameter portion.

According to an aspect (b) of the shielded conduction path according to the present design, a large-diameter portion whose outer diameter is larger than that of the reduced diameter portion may be formed in a region of the outer circumference of the pipe on an end portion side relative to the reduced diameter portion. According to this configuration, various types of processing such as the connection of another member can be performed on the region of the pipe that is on the end portion side relative to the crimp ring.

According to an aspect (c) of the shielded conduction path according to the present design, the shielded conduction path may further include an exterior body that envelops a portion of the pipe to which the braided wire is fixed and the entire region of the braided wire. According to this configuration, it is possible to protect the braided wire from interference with a foreign object and the like.

According to an aspect (d) of the shielded conduction path according to the present design, a cross-sectional shape of the outer circumference of the crimp ring may be approximately circular. According to this configuration, protrusion portions do not exist on the outer circumference of the crimp ring, and therefore the diameter of the fixed portion can be reduced even further.

According to aspect (e), in the shielded conduction path according to aspect (c) or (d) of the present design, a pair of the reduced diameter portions may be respectively formed on two end portions of the pipe, a pair of braided wires may be respectively fixed to the pair of reduced diameter portions, and the exterior body may be a unified member that envelops the entire length of the pipe and the entire length of the pair of braided wires. According to this configuration, the number of parts can be reduced in comparison to the case where the two braided wires are enveloped by separate exterior bodies.

According to aspect (f), in the shielded conduction path according to aspect (e) of the present design, the exterior body may be a corrugated tube that has a bellows shape over the entire length thereof. According to this configuration, an existing corrugated tube can be used as the exterior body, thus making it possible to achieve cost reduction.

According to aspect (g), in the shielded conduction path according to aspect (e) of the present design, the exterior body may include a constant diameter portion that envelops the pipe and whose diameter dimension is constant, and a pair of bellows portions that respectively envelop the pair of braided wires. According to this configuration, it is possible to insert the pipe into the exterior body first, and thereafter bend the constant diameter portion along with the pipe.

In any of aspects (e) to (g) of the shielded conduction path according to the present design, the exterior body may be orange. According to this configuration, it is possible to omit a step for painting the pipe orange, thus making it possible to achieve cost reduction.

First Embodiment

Hereinafter, a first embodiment of the present design will be described with reference to FIGS. 1 to 4. A shielded conduction path A of the first embodiment is routed between a battery 20 and an inverter apparatus 21 in a hybrid automobile, an electric automobile, or the like. The shielded conduction path A includes one pipe 10, two braided wires 14, crimp rings 16, one conduction path main body 17, and an exterior body 19.

The pipe 10 is made of a single type of metal material and has a circular cross-sectional shape. The wall thickness of the pipe 10 is constant over the entire region of the pipe 10. The pipe 10 exhibits a shielding function. The pipe 10 is routed along the bottom of an automobile body (not shown), and thus is bent so as to conform to the shape of the bottom of the vehicle body. The bending of the pipe 10 is performed in a state in which the conduction path main body 17 has been inserted into the pipe 10.

Figure 1:
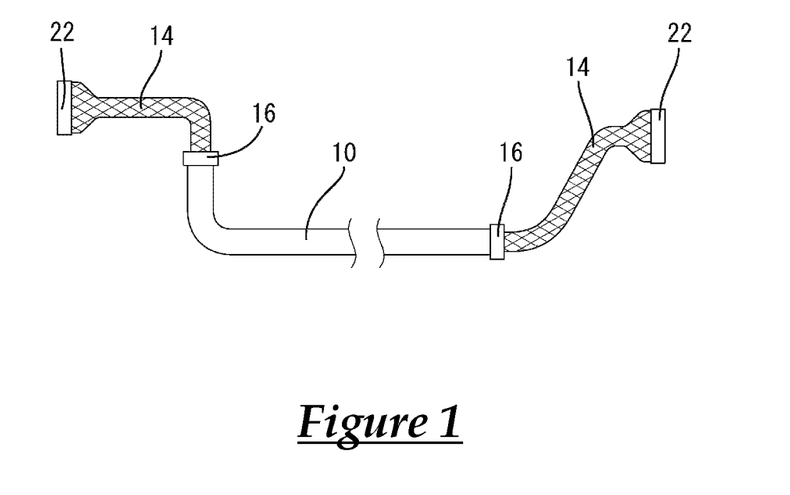
FIG. 1 is an external view of a pipe and braided wires that are not enveloped by an exterior body in a first embodiment.
Figure 3:
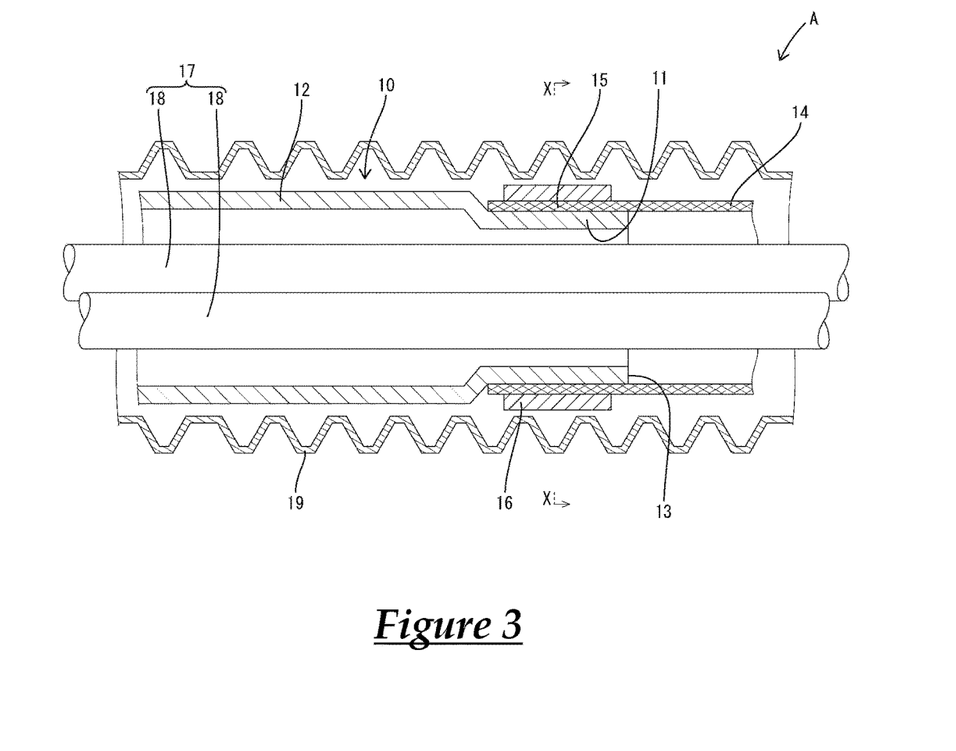
FIG. 3 is a partially enlarged side cross-sectional view of the shielded conduction path.

Reduced diameter portions 11 are formed at respective end portions of the pipe 10. The majority of the region of the pipe 10, where the reduced diameter portions 11 are not formed, is a non-reduced diameter region 12. The cross-sectional shape of the reduced diameter portions 11 is a circle that is concentric with the non-reduced diameter region 12. The outer diameter and the inner diameter of the reduced diameter portions 11 are respectively smaller than the outer diameter and the inner diameter of the non-reduced diameter region 12. Also, the wall thickness of the reduced diameter portions 11 is somewhat smaller than the wall thickness of the non-reduced diameter region 12. The formation region of each of the reduced diameter portions 11 in the axial direction of the pipe 10 is a range that extends from an end portion of the non-reduced diameter region 12 to an end surface 13 of the pipe 10.

The braided wires 14 are each constituted by metal strands (not shown) that are braided into a mesh. The braided wires 14 have a tubular shape when fixed to the pipe 10. The braided wires 14 have flexibility and also exhibit a shielding function. Base end portions 15 of the braided wires 14 envelop the reduced diameter portions 11 while also being in contact with the outer circumferences of the reduced diameter portions 11. It should be noted that the range enveloped by the base end portions 15 of the braided wires 14 is only the reduced diameter portions 11, and the non-reduced diameter region 12 is not to be enveloped. The base end portions 15 of the braided wires 14 are fixed in an electrically conductive manner to the reduced diameter portions 11 by the later-described crimp rings 16. The majority of the region of each of the braided wires 14, which excludes the base end portion 15, extends out from the end portion of the pipe 10.

Figure 4:
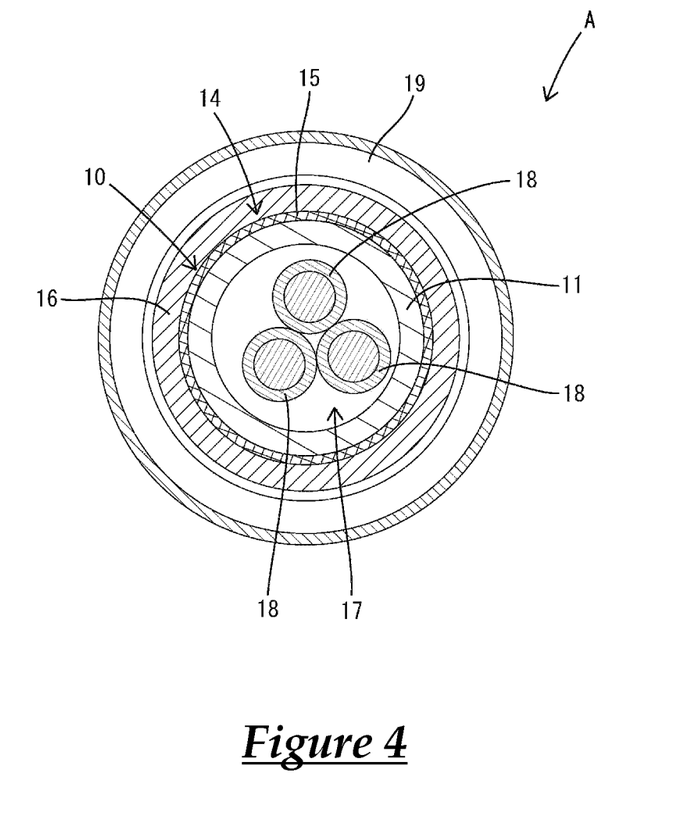
FIG. 4 is a cross-sectional view taken along line X-X in FIG. 3.

The crimp rings 16 are made of a metal, and are used as a means for fixing the braided wires 14 to the pipe 10. In the fixed state, the crimp rings 16 are arranged so as to envelop the outer circumference of the base end portions 15 of the braided wires 14. In other words, the base end portions 15 of the braided wires 14 are clamped in the diameter direction between the reduced diameter portions 11 of the pipe 10 and the crimp rings 16, and the base end portions 15 of the braided wires 14 are fixed to the reduced diameter portions 11 due to this clamping. In the fixed state, the outer circumferences of the crimp rings 16 are approximately shaped as circles that are concentric with the pipe 10. Also, the outer diameter of the crimp rings 16 is a dimension somewhat larger than the outer diameter of the non-reduced diameter region 12 of the pipe 10.

Before starting the step for fixing the braided wires 14 to the pipe 10 using the crimp rings 16, the reduced diameter portions 11 have not been formed in the pipe 10, and the outer diameter of the pipe 10 is constant over the entire length thereof. In the fixing step, the base end portions 15 of the braided wires 14 are placed over the end portions of the pipe 10, and a crimping tool (not shown) is used to set the crimp rings 16 so as to envelop the base end portions 15 of the braided wires 14. Due to the crimping tool, the crimp rings 16 undergo deformation so as to decrease in diameter while also undergoing deformation into a non-circular shape, and the outer circumference of the end portions of the pipe 10 undergo deformation in a manner of being pressed inward in the diameter direction. When the crimp rings 16 undergo crimping deformation in this way, the reduced diameter portions 11 are formed in the pipe 10, and the braided wires 14 are fixed to the pipe 10.

Figure 2:
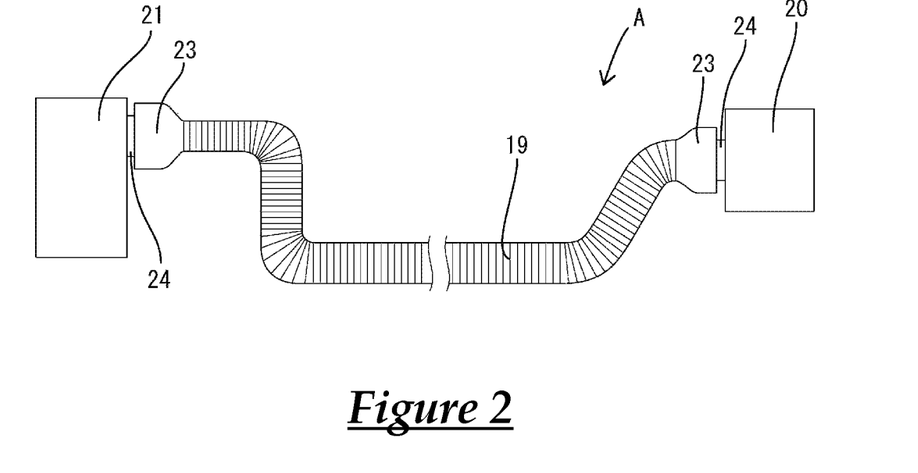
FIG. 2 is an external view of a shielded conduction path.

The conduction path main body 17 is constituted by bundling together multiple (three in the present embodiment) sheathed electrical lines 18 into a harness shape. Female terminal fittings (not shown) are respectively connected to the two end portions of each of the sheathed electrical lines 18. The conduction path main body 17 with the female terminal fittings connected thereto is inserted into the pipe 10 and the two braided wires 14. The female terminal fittings at the two end portions of the conduction path main body 17 are attached to the inside of harness-side connectors 22. Also, the tip portions of the two braided wires 14 (the end portions on the sides opposite to the base end portions 15) are fixed so as to be able to be in electrical conduction with shielded shells (not shown) that constitute the harness-side connectors 22.

The exterior body 19 is made of a synthetic resin and has a tubular shape. The exterior body 19 is constituted by a corrugated tube that has a bellows shape over the entire length thereof. Accordingly, the exterior body 19 is flexible and can undergo deformation such that its axis curves. The minimum inner diameter of the exterior body 19 is set to a dimension larger than the outer diameter of the crimp rings 16. The exterior body 19 has a waterproofing function, and envelops the entire region of the pipe 10 and the entire region of the two braided wires 14. The step for attaching the terminal fittings to the harness-side connectors 22 is performed after inserting the pipe 10 and the braided wires 14 into the exterior body 19. Grommets 23 that are made of rubber, are separate from the exterior body 19, and function as waterproofing means are attached to the two end portions of the exterior body 19. The grommets 23 are fitted around the harness-side connectors 22.

In the shielded conduction path A having the above configuration, the regions in which the braided wires 14 envelop the conduction path main body 17 are routed so as to include a curved path between the pipe 10 and the battery 20 and between the pipe 10 and the inverter apparatus 21. Also, one of the two harness-side connectors 22 is mated to a device-side connector 24 of the battery 20, and the other harness-side connector 22 is mated to a device-side connector 24 of the inverter apparatus 21.

The shielded conduction path A of the first embodiment includes the pipe 10 that has a shielding function, the reduced diameter portions 11 that are formed in the outer circumference of the pipe 10, the braided wires 14 that have a shielding function and are arranged such that the base end portions 15 thereof envelop the outer circumference of the reduced diameter portions 11, the crimp rings 16 that are arranged so as to envelop the outer circumference of the base end portions 15 of the braided wires 14 and fix the braided wires 14 to the reduced diameter portions 11, and the conduction path main body 17 that is inserted into the pipe 10 and into the braided wires 14.

The portions of the pipe 10 to which the braided wires 14 are fixed are the reduced diameter portions 11 that have a reduced outer diameter dimension, and thus it is possible to reduce the diameter of the portions in which the pipe 10 and the braided wires 14 are fixed. Accordingly, it is possible to also reduce the outer diameter of the exterior body 19. Moreover, the cross-sectional shape of the outer circumference of the crimp rings 16 is approximately circular, and large protrusions do not exist on the outer circumference of the crimp rings 16. Accordingly, the diameter of the exterior body 19 can be reduced in comparison to the case where protrusions exist on the outer circumference of the crimp rings 16.

Also, the formation regions of the reduced diameter portions 11 in the axial direction are ranges that extend from the end portions of the non-reduced diameter region 12 to the end surfaces 13 of the pipe 10. Accordingly, the outer diameter of the regions of the braided wires 14 that envelop the pipe 10 (the outer diameter of the base end portions 15) is necessarily smaller than the outer diameter of the non-reduced diameter region 12 that excludes the reduced diameter portions 11 of the pipe 10.

Also, the shielded conduction path A further includes the exterior body 19 that envelops the portions of the pipe 10 to which the braided wires 14 are fixed (the reduced diameter portions 11 of the pipe 10) and the entire region of the braided wires 14, thus making it possible to protect the braided wires 14 from interference with foreign objects and the like. Also, the exterior body 19 is constituted by a corrugated tube that has a bellows shape over the entire length thereof. An existing corrugated tube can be used as the exterior body 19, thus making it possible to achieve cost reduction.

Also, the pair of reduced diameter portions 11 are formed on respective end portions of the pipe 10, and the braided wires 14 are respectively fixed to the pair of reduced diameter portions 11, and due to this configuration, the exterior body 19 is a unified member that envelops the entire length of the pipe 10 and the entire length of the pair of braided wires 14. According to this configuration, the number of parts can be reduced in comparison to the case where the two braided wires 14 are enveloped by separate exterior bodies. Also, the exterior body 19 is a part that is made of a synthetic resin that includes an orange pigment. According to this configuration, it is possible to omit a step for painting the pipe 10 orange, thus making it possible to achieve cost reduction.

Second Embodiment

Figure 5:
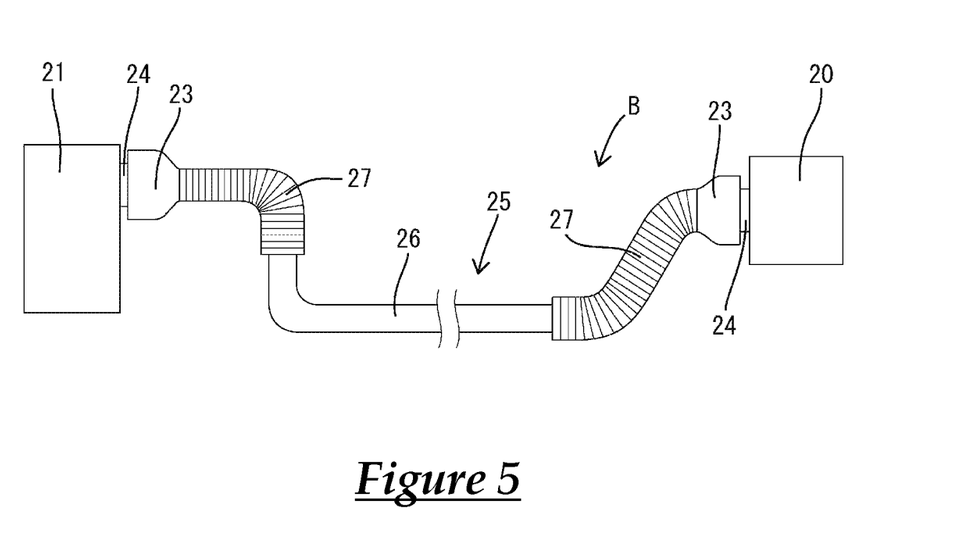
FIG. 5 is an external view of a shielded conduction path according to a second embodiment.
Figure 6:
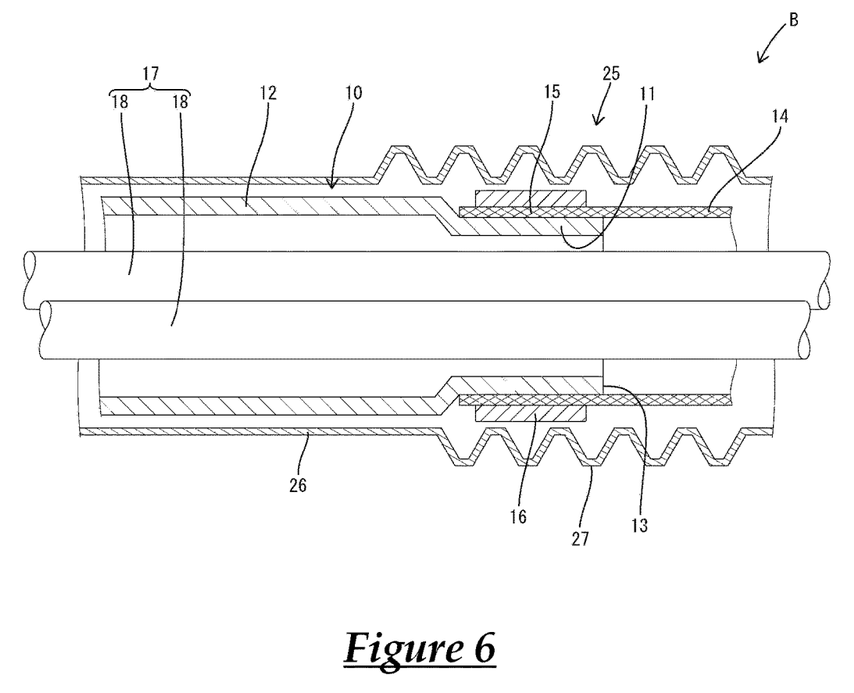
FIG. 6 is a partially enlarged side cross-sectional view of the shielded conduction path.

Next, a second embodiment of the present invention will be described with reference to FIGS. 5 and 6. In a shielded conduction path B of the second embodiment, an exterior body 25 has a different configuration from the exterior body of the first embodiment. Other configurations are the same as in the first embodiment, and therefore like configurations will be denoted by like reference signs, and redundant descriptions will not be given for the structures, actions, and effects of such configurations.

The exterior body 25 of the second embodiment is a unified part that is constituted by a constant diameter portion 26 and a pair of bellows portions 27. The constant diameter portion 26 has a constant outer diameter dimension and inner diameter dimension over the entire length thereof. The inner diameter of the constant diameter portion 26 is set to a dimension somewhat larger than the outer diameter of the crimp rings 16. In the second embodiment, the length of the constant diameter portion 26 is shorter than the overall length of the pipe 10, and is approximately the same as the entire length of the non-reduced diameter region 12. The length of the bellows portions 27 is approximately the same length as the braided wires 14. The minimum inner diameter of the bellows portions 27 is set to a dimension that is the same as the inner diameter of the constant diameter portion 26 and somewhat larger than the outer diameter of the crimp rings 16.

The constant diameter portion 26 envelops the non-reduced diameter region 12 of the pipe 10, and the bellows portions 27 envelop approximately the entire regions of the braided wires 14, including the base end portions 15 that are fixed to the reduced diameter portions 11. In the process for manufacturing the shielded conduction path B, before the pipe 10 is bent, the conduction path main body 17 is inserted into the pipe 10 and the braided wires 14, and the braided wires 14 and the pipe 10 are inserted into the exterior body 25, and thereafter the pipe 10 is bent along with the constant diameter portion 26.

Third Embodiment

Figure 7:
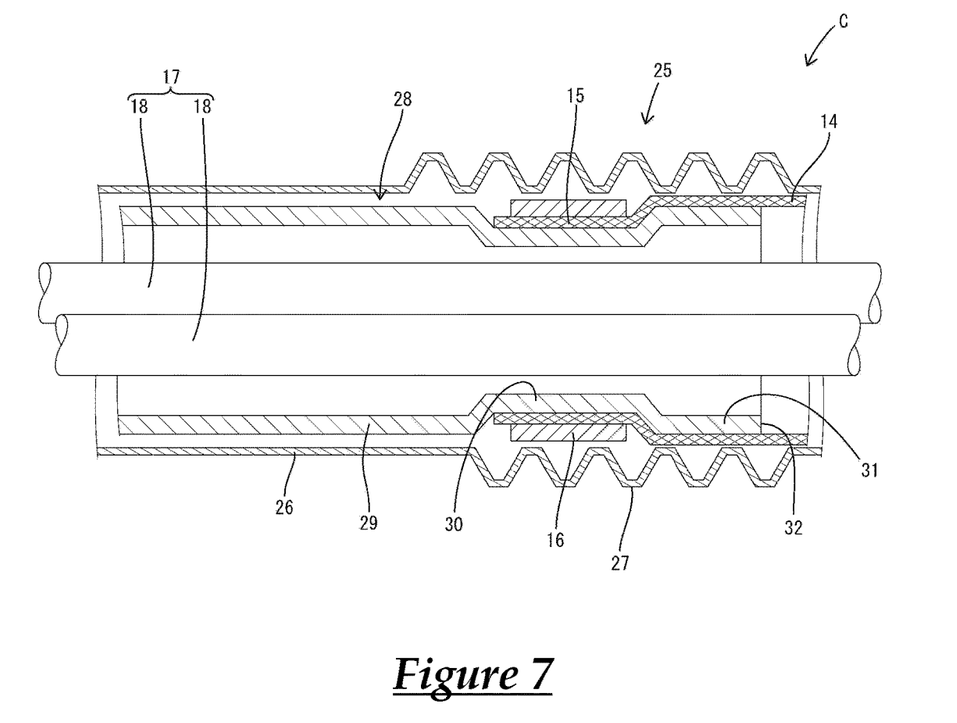
FIG. 7 is a partially enlarged side cross-sectional view of a shielded conduction path according to a third embodiment.

Next, a third embodiment of the present invention will be described with reference to FIG. 7. In a shielded conduction path C of the third embodiment, a pipe 28 has a different configuration from the pipe of the second embodiment. Other configurations are the same as in the second embodiment, and therefore like configurations will be denoted by like reference signs, and redundant descriptions will not be given for the structures, actions, and effects of such configurations.

The pipe 28 of the third embodiment is configured to include a non-reduced diameter region 29, a pair of reduced diameter portions 30, and a pair of large-diameter portions 31. The non-reduced diameter region 29 occupies a majority of the pipe 28 in the length direction thereof. The formation regions of the reduced diameter portions 30 in the axial direction of the pipe 28 are ranges that extend from the end portions of the non-reduced diameter region 29 to positions on the non-reduced diameter region 29 side relative to end surfaces 32 of the pipe 28. Out of the two end portions of each of the reduced diameter portion 30 in the axial direction, the end portion on the side opposite to the non-reduced diameter region 29 is continuous with the large-diameter portion 31. The formation region of the large-diameter portion 31 in the axial direction is a range that extends from the end portion of the reduced diameter portion 30 to the end surface 32 of the pipe 28. The outer diameter of the large-diameter portions 31 is approximately the same dimension as that of the non-reduced diameter region 29 and larger than the outer diameter of the reduced diameter portions 30.

The formation regions of the reduced diameter portions 30 in the axial direction do not extend to the end surfaces 32 of the pipe 28, and the large-diameter portions 31, which are not enveloped by the crimp rings 16, exist in the end portions (portions more toward the ends than the reduced diameter portions 30 are) of the pipe 28. Also, it is only the reduced diameter portions 30 that are enveloped by the crimp rings 16. Accordingly, in the state where the base end portions 15 of the braided wires 14 have been fixed to the reduced diameter portions 30 by the crimp rings 16, the regions of the braided wires 14 more toward the tip than the base end portions 15 envelop the large-diameter portion 31. These large-diameter portions 31 can be subjected to other processing such as having another member fixed thereto.

Other Embodiments

The present invention is not limited to the embodiments described above using the foregoing description and drawings, and embodiments such as the following are also encompassed in the technical scope of the present invention.

Although the cross-sectional shape of the outer circumference of the crimp rings is circular in the first to third embodiments, the cross-sectional shape of the crimp rings may be a shape other than a circle.

Although the portions of the pipe to which the braided wires are fixed and the entire region of the braided wires are enveloped by the exterior body in the first to third embodiments, a configuration is possible in which such an exterior body is not provided.

Although the two braided wires are enveloped by one exterior body in the first to third embodiments, the two braided wires may be enveloped by separate exterior bodies.

Although the braided wires are fixed to the two end portions of the pipe in the first to third embodiments, the present design is also applicable to the case where a braided wire is fixed to only one end portion of the pipe.

Although the reduced diameter portions are formed in the step for crimping the crimp rings in the first to third embodiments, a configuration is possible in which the reduced diameter portions are formed in the pipe in advance, and then the braided wires are fixed to the reduced diameter portions by the crimp rings.

Figure 8:
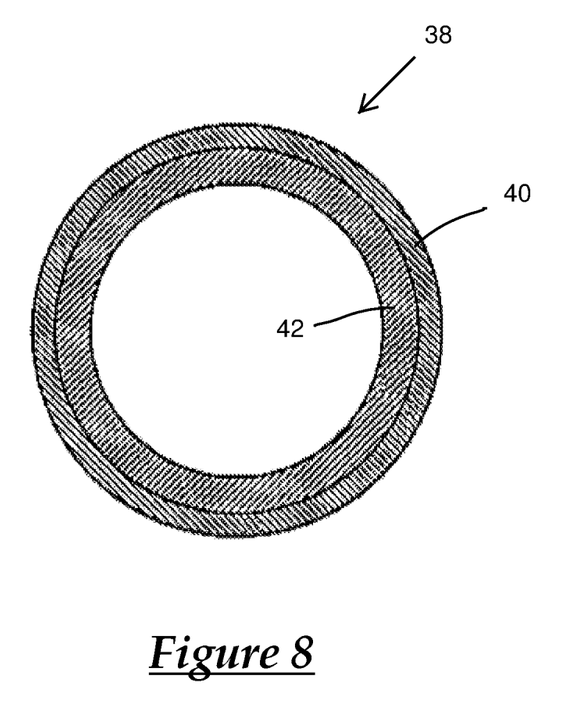
FIG. 8 is a cross-sectional view of a pipe according to a fourth embodiment.

Although the pipe 10, 28 is a unified member that is made of a metal in the first to third embodiments, the pipe 38 may have a compound configuration in which an electrically conductive shielding layer 40 is laminated on or embedded in a pipe main body 42 that is not metallic.

In the first to third embodiments, the outer diameter of the crimp rings is a dimension that is larger than the outer diameter of the non-reduced diameter region of the pipe in which the reduced diameter portions are not formed, but the outer diameter of the crimp rings may be a dimension that is the same as or smaller than the outer diameter of the region of the pipe in which the reduced diameter portions are not formed.

Although the length of the constant diameter portion of the exterior body is somewhat shorter than the overall length of the pipe and approximately the same as the overall length of the non-reduced diameter region in the second embodiment, the present invention is not limited in this way, and the length of the constant diameter portion may be the same as the overall length of the pipe, may be longer than the overall length of the pipe, may be shorter than the non-reduced diameter region, or may be longer than the non-reduced diameter region.

The exterior body of the third embodiment may be a corrugated tube likewise to the first embodiment.

Although grommets are provided separately from the exterior body in the first to third embodiment, a mode is possible in which the grommets are not provided.

Although the exterior body envelops the entire length of the pipe and the entire lengths of the braided wires in the first to third embodiments, a configuration is possible in which the pipe is enveloped by the exterior body, and the braided wires are enveloped by the grommets.

The invention claimed is:

1. A shielded conduction path, comprising:
   an elongated pipe that has a shielding function, a non-reduced diameter portion, a reduced diameter portion, and an end portion that is unfolded, the reduced diameter portion is formed in an outer circumference of the pipe and extends in an axial direction from the non-reduced diameter portion to an end surface of the end portion;
   a braided wire that has a shielding function and a base end portion, the braided wire is arranged such that the base end portion of the braided wire envelops an outer circumference of the reduced diameter portion of the pipe;
   a crimp ring that is arranged so as to envelop an outer circumference of the base end portion of the braided wire and is located entirely within the reduced diameter portion of the pipe, the crimp ring securely fixes the base end portion of the braided wire to the reduced diameter portion of the pipe; and
   a conduction path main body that is inserted into the pipe and into the braided wire, wherein the pipe has a structure in which an elongated electrically conductive shielding layer is laminated on an elongated pipe main body so as to provide the shielding function along the elongated pipe main body, wherein the elongated pipe is not metallic.

2. The shielded conduction path according to claim 1, wherein an inner diameter of the reduced diameter portion is smaller than an inner diameter of the non-reduced diameter portion.

3. A shielded conduction path, comprising:
   an elongated pipe that has a shielding function, a non-reduced diameter portion, and an end portion that is unfolded;
   a braided wire that has a shielding function and a base end portion, the braided wire is arranged such that the base end portion of the braided wire envelops an outer circumference of the pipe;
   a crimp ring that is arranged so as to envelop an outer circumference of the base end portion of the braided wire that envelops the outer circumference of the pipe; and
   a conduction path main body that is inserted into the pipe and into the braided wire, wherein the pipe has a structure in which an elongated electrically conductive shielding layer is laminated on an elongated pipe main body so as to provide the shielding function along the elongated pipe main body, wherein the elongated pipe is not metallic,
   wherein a portion of the pipe where the crimp ring envelops is a reduced diameter portion of the pipe that extends in an axial direction from the non-reduced diameter portion to an end surface of the end portion of the pipe, and
   wherein the crimp ring is located entirely within the reduced diameter portion of the pipe, the crimp ring securely fixes the base end portion of the braided wire to the reduced diameter portion of the pipe.

* * * * *